(No Model.)
T. WEARE.
ROOF.
No. 502,940. Patented Aug. 8, 1893.
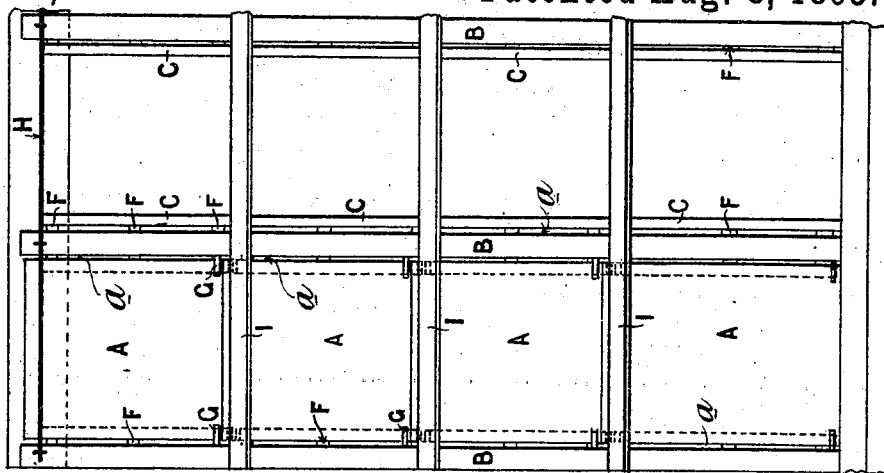
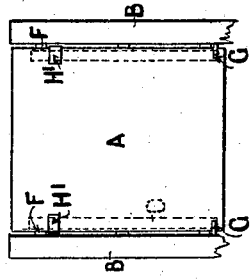
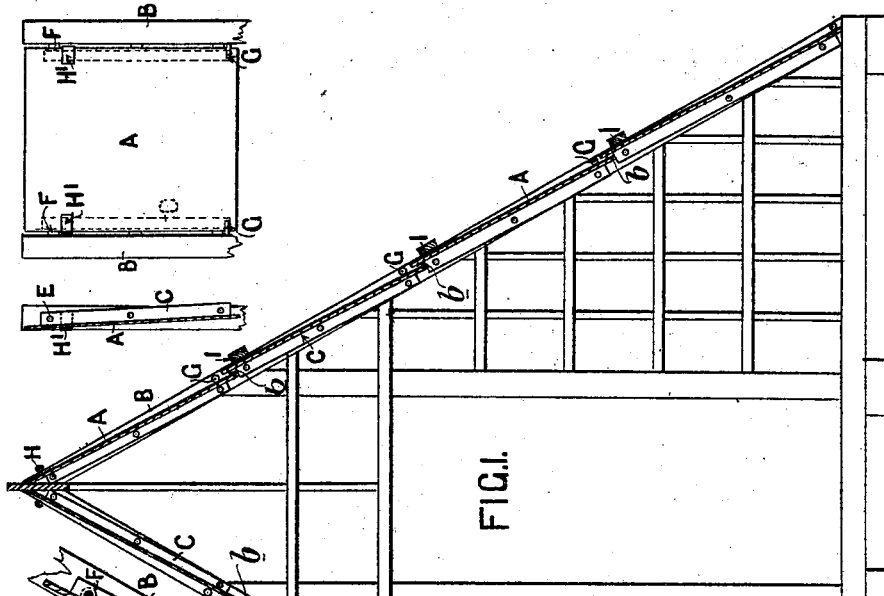
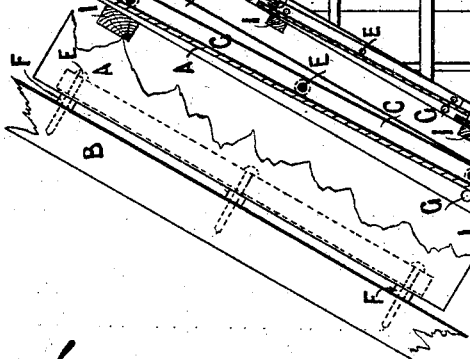
Witnesses: H. G. Dieterich, P. W. Sommers.
Inventor: Thomas Weare,
By [signature] Atty.

UNITED STATES PATENT OFFICE.

THOMAS WEARE, OF KUMEO JUNCTION, NEW ZEALAND.

ROOF.

SPECIFICATION forming part of Letters Patent No. 502,910, dated August 8, 1893.

Application filed January 7, 1893. Serial No. 457,586. (No model.) Patented in New Zealand June 1, 1891, No. 5,031.

*To all whom it may concern:*

Be it known that I, THOMAS WEARE, a subject of the Queen of Great Britain, residing at Kumeo Junction, Province of Auckland, and Colony of New Zealand, have invented new and useful improvements in roofs for houses in which vines, fruit-trees, and other trees, shrubs, and plants are grown and for other structures, (for which I have obtained a patent in New Zealand, No. 5,031, bearing date of June 1, 1891,) of which the following is a specification.

The principal object of this invention is to provide for the automatic free admission of air and moisture to vines, fruit trees and other trees, shrubs and plants growing under glass in such manner that the free circulation or exchange of the inner atmosphere is effected without injurious drafts and the growth of mildew rendered impossible. The invention is however also applicable as a means of ventilation only to other structures such for instance as offices in railway stations and stands and stalls in other large buildings for exhibitions and shows for the purpose of providing better ventilation for such indoor structures, the roofing material in such cases not necessarily being made of glass or other transparent or translucent material.

My improved glass roof is constructed in the following manner: At the sides of each vertically running row of glass sheets a narrow lateral space say about a quarter of an inch wide is left open and between the top of each glass sheet and the bottom of the next higher glass sheet narrow height spaces are left open. The aforesaid lateral spaces between the sheets of glass or other roofing material are suitably produced by making the clear space between the rafters slightly wider than the width of the glass sheets and by supporting the glass sheets on narrow strips or fillets of wood which are fixed to the sides of the rafters with a narrow space, inch wide, between fillet and rafter and the height spaces are formed by giving the fillets a sufficiently greater rise or angle than the rafters.

Figure 1 of the accompanying drawings is a vertical transverse section through a glass roof of my construction and Fig. 2 a side view of same. Fig. 3 is a plan view to a larger scale of part of the roof to illustrate the manner of supporting the glass sheets and Fig. 4 a sectional side view. Fig. 5 is a sectional side view and Fig. 6 front view illustrating a mode of holding the glass sheets in place.

The glass sheets A are shown slightly narrower than the spaces between the rafters B. At the right hand of Fig. 2 the sheets A are shown omitted in order to show the roof construction in a clearer manner.

The glass sheets A are supported on strips or fillets C by preference of wood. Lateral spaces $a$ say about one-fourth of an inch wide are thus formed at the sides of each sheet A and rafter B for ventilation. The fillets C are fastened to the sides of the rafters B by means of nails or screws E having by preference washers F or blocks say about one-fourth or three-eighths of an inch thick but in any case so as to leave that width of space between fillet and rafter. If washers are used the nails or screws E can be driven home in the rafters. In order to give the overlap of the glass sheets the fillets C have not the same angle as that of the rafters B but have a greater fall or slope say about three-eighths or one inch so that each sheet of glass not only can overlap the one next above it but so that a vertical space $b$ say about one to three quarters of an inch high is left between them. It will be noticed that the overlap is the reverse of that of the usual glass roof in which latter the overlap serves to exclude the entry of rain from the outside and the exit of dew from the inside of the house. The bottom edge of each glass sheet A abuts against the upper ends of the fillets C which support the sheet glass immediately below it and so on from the roof ridge down to the eaves.

The lower ends of the sheets A are in the example shown kept from rising by wire pins or nails G preferably of brass or the like driven into the sides of the rafters B close to the glass but so that the latter can be removed at any time. The upper ends of the sheets A especially at or near the ridge of the roof are kept in place by galvanized wire H held down by staples driven into the rafters B Figs. 1 and 2, or I may as shown in Figs. 5 and 6 use lead strips H' fixed to the sides of the fillets C and bent over the sheet A. Battens I may be fastened to the rafters B and run horizontally lengthwise of the roof thus also strengthening the whole roof. The roof shown has in this example a base equal to the sides and I prefer this for glass houses without side walls.

It will be understood from the above that in roofs constructed according to this invention facility is given for the entry of air, rain and dew the moisture running down from the lower edge of the sheets of glass, and the air entering or circulating freely and especially by way of the spaces $b$ left between the lower edge of one sheet and the upper edge of the next following lower sheet, while at the same time the overlap of the latter prevents the direct entry of vertical columns of air and shelters the vines or other plants from winds which must pass over the roof and absolute freedom is given for atmospheric circulation without drafts.

Sometimes it is useful in connection with the above ventilated roof to make apertures for the entry of air at the bottom of the roof or in the walls of the house covered by such a roof.

What I claim, and desire to secure by Letters Patent of the United States, is—

1. In a ventilated roof the rafters in combination with roofing-material-supporting-fillets fixed thereto with intermediate lateral spaces and with a suitably greater rise or angle than that of the rafters, sheets of roofing material, of a less width than the clear space between the rafters and overlapping each other in such manner that a space is left in height between the upper edge of one sheet and the lower edge of the next following upper sheet, and means for holding the sheets in place substantially as set forth.

2. In a ventilated roof the rafters B in combination with the fillets C fixed thereto by means of screws or nails E with washers F between rafter and fillet, the latter having a suitably greater rise or angle than that of the rafter sheets A, of roofing material of a less width than the clear space between the rafters so as to form lateral air spaces $a$ and overlapping each other in such manner that a height space $b$ is left between the upper edge of one sheet and the lower edge of the next following upper sheet, the pegs G for holding the lower ends of the sheets in place, and the wires H with staples for holding the upper ends of the sheets in place, substantially as set forth.

November 4, 1892.

THOMAS WEARE.

Witnesses:
 WALTER D. COSSAR,
 VICTOR A. AMODEO,
  *Solr's Clerks, Auckland, N. Z.*